United States Patent
Qiu et al.

(10) Patent No.: US 11,226,701 B2
(45) Date of Patent: Jan. 18, 2022

(54) TOUCH PANEL CONTROL CIRCUIT AND TOUCH PANEL

(71) Applicants: GUANGZHOU SHIYUAN ELECTRONICS CO., LTD., Guangzhou (CN); GUANGZHOU SHIRUI ELECTRONICS CO., LTD., Guangzhou (CN)

(72) Inventors: Weibo Qiu, Guangzhou (CN); Qiyuan Yang, Guangzhou (CN)

(73) Assignees: GUANGZHOU SHIYUAN ELECTRONICS CO., LTD., Guangdong (CN); GUANGZHOU SHIRUI ELECTRONICS CO., LTD., Guangdong (CN)

( * ) Notice: Subject to any disclaimer, the term of this patent is extended or adjusted under 35 U.S.C. 154(b) by 0 days.

(21) Appl. No.: 17/043,411

(22) PCT Filed: Nov. 16, 2018

(86) PCT No.: PCT/CN2018/115965
§ 371 (c)(1),
(2) Date: Sep. 29, 2020

(87) PCT Pub. No.: WO2019/200906
PCT Pub. Date: Oct. 24, 2019

(65) Prior Publication Data
US 2021/0019012 A1    Jan. 21, 2021

(30) Foreign Application Priority Data
Apr. 16, 2018  (CN) .......................... 201810339498.2

(51) Int. Cl.
*G06F 3/041*    (2006.01)
*G06F 3/042*    (2006.01)
(Continued)

(52) U.S. Cl.
CPC ........ *G06F 3/0416* (2013.01); *G06F 13/4282* (2013.01); *G06F 3/042* (2013.01);
(Continued)

(58) Field of Classification Search
None
See application file for complete search history.

(56) References Cited

U.S. PATENT DOCUMENTS

2004/0205280 A1  10/2004 Jeansonne et al.
2012/0001862 A1   1/2012 Durbin et al.
2016/0323620 A1*  11/2016 Kim ................... H04N 21/4122

FOREIGN PATENT DOCUMENTS

CN    101237157 A    8/2008
CN    201766652 U    3/2011
(Continued)

OTHER PUBLICATIONS

ISR for International Application PCT/CN2018/115965 dated Jan. 29, 2019.
(Continued)

*Primary Examiner* — Stephen T. Reed
(74) *Attorney, Agent, or Firm* — Ladas & Parry LLP

(57) ABSTRACT

A touch panel control circuit and a touch panel. The touch panel control circuit includes a touch transfer module, a main chip and a signal source interface. An input interface (A) of the touch transfer module is configured to be connected to an output interface of a touch input device to receive a first touch coordinate signal form the output interface of the touch input device. A first transmission interface of the touch transfer module is connected to a touch information transmission interface (E) of the main chip. A second transmission interface (B2) of the touch transfer module is connected to the signal source interface. The touch transfer module is configured to receive, via the first (Continued)

transmission interface (B1), a signal distribution instruction from the touch information transmission interface (E) of the main chip, and to send, based on the signal distribution instruction, a second touch coordinate signal corresponding to the first touch coordinate signal, from at least one of the first transmission interface (B1) and the second transmission interface (B2).

10 Claims, 2 Drawing Sheets

(51) Int. Cl.
*G06F 3/044* (2006.01)
*G06F 3/046* (2006.01)
*G06F 13/42* (2006.01)

(52) U.S. Cl.
CPC .............. *G06F 3/044* (2013.01); *G06F 3/046* (2013.01); *G06F 2213/0042* (2013.01)

(56) References Cited

FOREIGN PATENT DOCUMENTS

| CN | 102333152 A | 1/2012 |
|---|---|---|
| CN | 202433858 U | 9/2012 |
| CN | 103197801 A | 7/2013 |
| CN | 203872249 U | 10/2014 |
| CN | 204117354 U | 1/2015 |
| CN | 204203320 U | 3/2015 |
| CN | 204633911 U | 9/2015 |
| CN | 106293262 A | 1/2017 |
| CN | 107368219 A | 11/2017 |
| CN | 206991177 U | 2/2018 |
| CN | 108549500 A | 9/2018 |

OTHER PUBLICATIONS

Written Opinion for International Application PCT/CN2018/115965.
First Chinese Office Action and English Translation thereof for Application No. CN201810339498.2.
Second Chinese Office Action and English Translation thereof for Application No. CN201810339498.2.
108549500 A—English Translation.
204117354 U—English Translation.
202433858 U—English Translation.
106293262 A—English Translation.
204203320 U—English Translation.
201766652 U—English Translation.
204633911 U—English Translation.
102333152 A—English Translation.
206991177 U—English Translation.
107368219 A—English Translation.
203872249 U—English Translation.
101237157 A—English Translation.
103197801 A—English Translation.

\* cited by examiner

TOUCH PANEL CONTROL CIRCUIT AND TOUCH PANEL

RELATED APPLICATION

This application is an application under 35 U.S.C. 371 of International Application No PCT/CN2018/115965 filed on 16 Nov. 2018, which claims priority from Chinese Application No. 201810339498.2 filed 16 Apr. 2018, the disclosures of which are incorporated in their entirety by reference herein.

TECHNICAL FIELD

The present disclosure relates to the field of touch input technology, in particular to a touch panel control circuit and a touch panel.

BACKGROUND

The touch panel with large screen and human-computer interaction has been widely used in multiplayer interactive scenarios such as class teaching and conference. In order to meet the multi-functional requirements in these scenarios, some touch panels are also equipped with signal source interface which allows access to multiple signal sources, such as access to an external computer equipment to display the display screen of external computer equipment on the touch panel on which a user can operate the display screen of external computer equipment, or access to a computer module with independent operating system to enable the touch panel to have double system operation interface.

When the user switches the display channel of the touch panel to an additional signal source channel, the touch input device of the touch panel (such as infrared touch box or electromagnetic screen) needs to transmit a touch coordinate information to the main chip and signal source respectively, so that the main chip can respond to the touch coordinate information to realize main system functions such as calling out the menu of switching channel and configuring the display properties. The additional signal source can also respond to the touch coordinate information to realize the operation indicated by the user's touch action. In an instance, the touch input device also needs to respond to the command of the main chip to differentiate the transmissions of the touch coordinate information on the two channels. For example, when calling up the menu of switching channels, the signal source should be prohibited to respond to the corresponding touch coordinate information corresponding to the menu area.

However, the general touch input device often has only one signal output interface. To develop a multi-channel touch panel, the supplier of touch input device should cooperate to add the amount of out of interface and customize the interface protocol to realize diversified processing of touch coordinate information transmission, and increase the development process of touch panel, and thus cost is high.

SUMMARY

The present disclosure provides a touch panel control circuit and a touch panel, which can use a general touch input device and simplify the development process of the touch panel and reduce the cost.

The present disclosure provides a touch panel control circuit which includes a touch diversion module, a main chip and a signal source interface.

The touch diversion module includes an input interface, a first transmission interface and a second transmission interface; the main chip includes a touch information transmission interface.

The input interface of the touch diversion module is configured to connect the output interface of the touch input device and receive a first touch coordinate signal from the output interface of the touch input device.

The first transmission interface of the touch diversion module is connected with the touch information transmission interface of the main chip; the second transmission interface of the touch diversion module is connected with the signal source interface; the touch diversion module is configured to receive, via the first transmission interface, the signal distribution instruction from the touch information transmission interface of the main chip, and further responsive to the signal distribution instruction, transmit a second touch coordinate signal corresponding to the first touch coordinate signal through the first transmission interface and/or the second transmission interface.

The present disclosure further provides a touch panel, which comprises a touch input device and a touch panel control circuit according to an embodiment of the invention.

The touch input device includes an output interface, which is connected with the input interface of the touch diversion module in the touch panel control circuit.

According to the present disclosure, a touch diversion module which receives the first touch coordinate signal from the touch input device and the signal distribution instruction from the main chip is added to the touch panel control circuit. The function of distributing touch coordinate signal to the external signal source and/or the main chip responsive to the signal distribution instruction is thus realized. That is, the touch diversion module not only realizes the expansion of the interface to complete the function of distributing touch coordinate signal to two channels, but also customizes an interface protocol on the touch diversion module to realize the distribution of touch coordinate signal responsive to the signal distribution instruction. Hence, the present disclosure addresses the problem of necessity for adding an output interface to the touch input device, customizing the interface protocol and increasing the development process of touch panel, so as to achieve the effect of enabling use of general touch input device, simplifying the development process of touch panel and reducing the cost.

DETAILED DESCRIPTION

Figure 1:
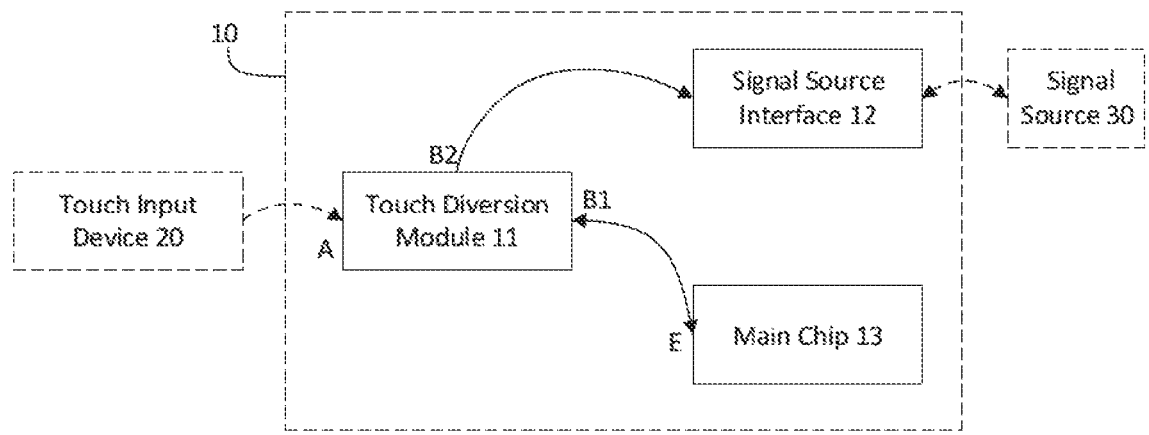
FIG. 1 is a schematic view of the touch panel control circuit according to a embodiment of the present disclosure.

The present disclosure will be further described in detail with reference to the attached drawings and embodiments. The specific embodiments described herein are only used to explain the disclosure and not intentional to limit the disclosure. In addition, it should be noted that for the convenience of description, only parts but not all structures related to the invention are shown in the drawings.

EXAMPLE 1

FIG. 1 is the schematic view of the touch panel control circuit according to an embodiment of the present disclosure. The touch panel control circuit 10 includes a touch diversion module 11, a main chip 13 and a signal source interface 12. The touch diversion module 11 includes an input interface A, a first transmission interface B1 and a second transmission interface B2. The main chip 13 includes a touch information transmission interface E.

The input interface A of the touch diversion module 11 is configured to connect the output interface of the touch input device 20 and receive the first touch coordinate signal front the output interface of the touch input device 20. The first transmission interface B1 of the touch diversion module 11 is connected with the touch information transmission interface E of the main chip 13. The second transmission interface B2 of the touch diversion module 11 is connected with the signal source interface 12, The touch diversion module 11 is configured to receive, via the first transmission interface B1, the signal distribution instruction from the touch information transmission interface E of the main chip 13, and further responsive to the signal distribution instruction, transmit the second touch coordinate signal corresponding to the first touch coordinate signal, through the first transmission interface B1 and/or the second transmission interface B2. In an embodiment, the signal source interface 12 is configured to connect the signal source 30. For example, the signal source interface is configured for pluggable connection of external computer module or wireless connection of external computer terminal, that is, the touch diversion module 11 transmits the second touch coordinate signal to the main chip 13 and or these signal sources 30, so that the main chip 13 and or the signal source 30 can respond to an touch action, executed by the user, on the touch input device 20.

In an embodiment, responsive to the signal distribution instruction, the second touch coordinate signal corresponding to the first touch coordinate signal is transmitted through the first transmission interface B1 and and/or the second transmission interface B2, which may include one or more of the following operations:

(1) Responsive to the signal distribution instruction, converting, according to the preset coordinate conversion algorithm, the first touch coordinate signal into the second touch coordinate signal, or setting the first touch coordinate signal as the second touch coordinate signal. Responsive to the signal distribution instruction, further transmitting the second touch coordinate signal through the first transmission interface B1 and/or the second transmission interface B2.

(2) Responsive to the signal distribution instruction, determining whether the second touch coordinate signal needs to be outputted. For example, an area on the touch panel is set as a specific functional area through the operating system or signal source system provided by the main chip 13. The functional area does not receive a touch input, and the transmission of the touch coordinate signal on the area to the main chip 13 or signal source 30 needs to be shielded, and the touch diversion module 11 determines whether to output the second touch coordinate signal based on the region coordinate range indicated by the signal distribution instruction. In an instance where the need of outputting the second touch coordinate signal is determined, further responsive to the signal distribution instruction, transmitting the second touch coordinate signal through the first transmission interface B1 and/or the second transmission interface B2.

(3) Responsive to the signal distribution instruction, determining whether the second touch coordinate signal is to be distributed to the main chip 13 or the signal source interface 12. For example, if the signal distribution instruction indicates that the display channel of the current touch panel is a main chip channel, that is, the current touch panel displays the video picture outputted by the main operating system, then the main chip 13 needs to respond to the second touch coordinate signal, and distribution of the second touch coordinate signal to the main chip 13 is needed. If the signal distribution instruction indicates that the display channel of the current touch panel is a signal source channel, that is, the current touch panel displays the video picture outputted by the external signal source system, such as the video picture of another operating system provided by the computer module connected to the touch panel, or the video picture provided by the external computer wirelessly connected to the touch panel, then the second touch coordinate signal needs to be distributed to the main chip 13 and the current signal source channel, so that the main chip 13 can respond to the second touch coordinate information to realize the main system functions such as calling out the menu of switching channels and configuring the display properties, and the signal source 30 can further respond to the touch coordinate information to realize the operation indicated by the user's touch action. Or, if the signal distribution instruction indicates that the display channel of the current touch panel is the signal source channel, but OSD (on-screen display) switch is open, in such a scenario, when the user makes selection of the menu option on the OSD switch called out by the main system, the operation executed by the signal source 30 corresponding to the display channel is triggered if the corresponding touch coordinate signal corresponding to the corresponding touch operation is transmitted to the current display channel. For example, if the hit board software is opened on the signal source system the selection of the menu option on the OSD switch will cause the handwriting corresponding to the user's touch track on the whiteboard software. In order to avoid this situation, it is necessary to shield the touch operation of the signal source channel, and only transmit the touch coordinate signal to the main chip 13. And, after the determination of object of distribution, transmitting the second touch coordinate signal to the object of distribution through the interface corresponding to the object of distribution, and the object of distribution is at least one of the main chip 13 and the signal source interface 12.

In order to enable the touch diversion module 11 to realize the above functions, one implementation is that the touch diversion module 11 includes a first MCU (Microcontroller Unit, not shown in the figure). Responsive to the signal distribution instruction, the first MCU is to determine which one of the first transmission interface and the second transmission interface is the interface for outputting the second touch coordinate signal.

In an embodiment, responsive to the signal distribution instruction, the first MCU is to determine whether to output the second touch coordinate signal. In an embodiment, when determination of outputting the second touch coordinate signal is made, the first MCU is further to determine which one of the first transmission interface B1 and the second transmission interface B2 is the interface for outputting the second touch coordinate signal, responsive to the signal distribution instruction.

In an embodiment, responsive to the signal distribution instruction, the first MCU is also to convert, according to the preset coordinate conversion algorithm, the first touch coordinate signal into the second touch coordinate signal.

According to an embodiment of the present disclosure, a touch diversion module which receives the first touch coordinate signal from the touch input device and the signal distribution instruction from the main chip is added to the touch panel control circuit. The function of distributing touch coordinate signal to the external signal source and/or the main chip responsive to the signal distribution instruction is thus realized.

That is, the touch diversion module not only realizes the expansion of the interface to complete the function of distributing touch coordinate signal to two channels, but also customizes an interface protocol on the touch diversion module to realize the distribution of touch coordinate signal responsive to the signal distribution instruction. Hence, the present disclosure addresses the problem of necessity for adding an output interface to the touch input device, customizing the interface protocol and increasing the development process of touch panel, so as to achieve the effect of enabling use of general touch input device, simplifying the development process of touch panel and reducing the cost.

EXAMPLE 2

Figure 2:
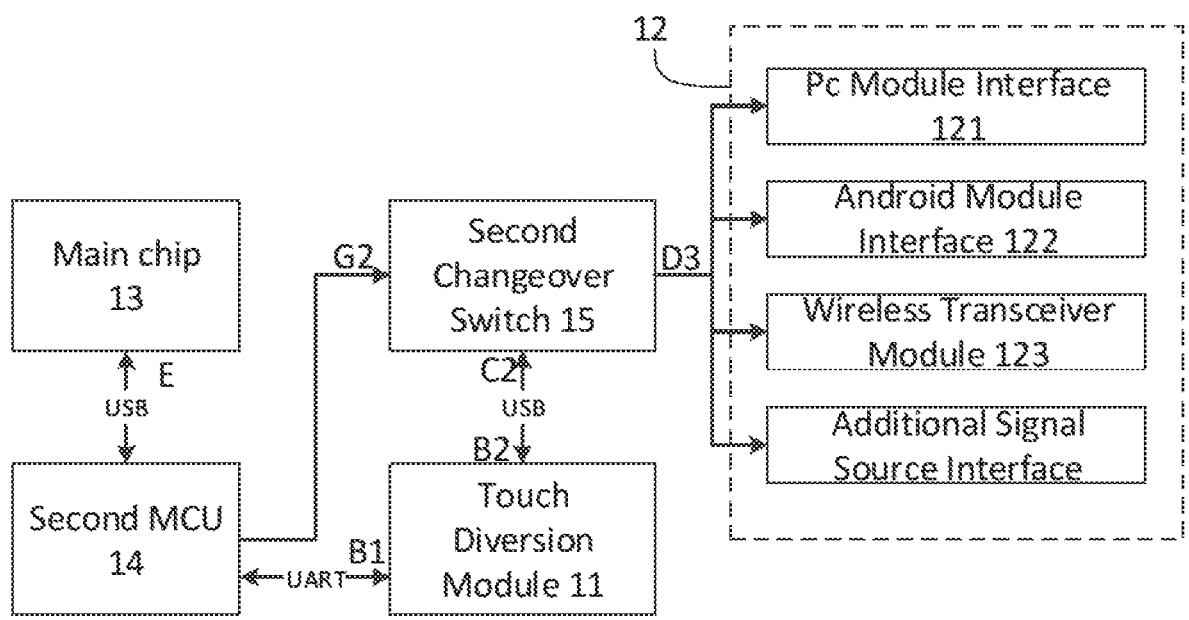
FIG. 2 is a schematic view of the touch panel control circuit according to another embodiment of the present disclosure.

FIG. 2 is a schematic view of the touch panel control circuit according to another embodiment. The touch panel control circuit includes a touch diversion module 11, a main chip 13 and a signal source interface 12. The touch diversion module 11 includes an input interface, a first transmission interface B1 and a second transmission interface B2. The main chip 13 includes a touch information transmission interface E. The input interface of the touch diversion module 11 is configured to connect the output interface of the touch input device 20, to receive the first touch coordinate signal from the output interface of the touch input device 20. The first transmission interface B1 of the touch diversion module 11 is connected with the touch information transmission interface E of the main chip 13. The second transmission interface B2 of the touch diversion module 11 is connected with the signal source interface 12. The touch diversion module 11 is configured to receive, via the first transmission interface B1, the signal distribution instruction from the touch information transmission interface E of the main chip 13, and further responsive to the signal distribution instruction, transmit the second touch coordinate signal corresponding to the first touch coordinate signal through the first transmission interface B1 and/or the second transmission interface B2.

In an embodiment, the touch panel control circuit includes a plurality of signal source interfaces 12. As shown in FIG. 2, the plurality of signal source interfaces 12 may include an interface configured far acquiring touch coordinate signals (Personal Computer, PC module interface 121 or Android module interface 122) of computer modules independent of the main chip 13 in the touch panel, an wireless transceiver module 123 configured for wirelessly connecting the wireless projector to obtain a video signal of the external computer connected to, the wireless projector and transmitting the touch coordinate signal to the external computer, and an additional signal source interface 124. The above plurality of signal source interfaces 12 are only illustrative, and those skilled in the art can customize the source interfaces 12 as at least one of above signal source interfaces, based on the user groups for which the touch panel is sold.

In order to connect the second transmission interface B2 of the touch diversion module 11 with the plurality of signal source interfaces 12, in this embodiment, the touch panel control circuit also includes a second switching switch 15, and the second switching switch 15 includes a second input terminal C2 and a plurality of third output terminals D3. The second switching switch 15 is connected between the second transmission interface B2 of the touch diversion module 11 and the plurality of signal source interfaces 12. The second input terminal C2 is connected with the second transmission interface B2, and a plurality of third output terminals D3 are connected with the plurality of signal source interfaces 12 in a one to one correspondence. The changeover switch is a switch element that selects an output terminal responsive to the signal of the control terminal and connects the output terminal and the input terminal. In this embodiment, the second changeover switch 15 realizes the one-to-many connection between the touch diversion module 11 and the signal source interface 12.

In an embodiment, the changeover switch configured to select the touch coordinate signal transmission is also the changeover switch configured to select the current display channel. Therefore, the control terminal of the second changeover switch 15 should receive the channel switching instruction. Due to the limited number of interfaces of the main chip 13, in this embodiment, the touch panel control circuit also includes a second MCU 14. In an embodiment, the second MCU 14 includes a first expansion terminal, a second expansion terminal and a third expansion terminal, and the second MCU 14 is connected between the first transmission interface B1 of the touch diversion module 11 and the touch information transmission interface E of the main chip 13. The first expansion terminal is connected, with the first transmission interface B1, and the second expansion terminal is connected with the touch information transmission interface E. The second changeover switch 15 further includes a second control terminal G2. The third expansion terminal is configured to output the channel switching instruction, and the third expansion terminal is connected with the second control terminal G2. Responsive to the channel switching instruction received by the second control terminal G2, the second changeover switch 15 is to determine which one of third output terminals D3 is connected with the second input terminal C2. In this embodiment, the second MCU 14 is used as a connecting part to realize the interface expansion of the interactive data between the main chip 13, the touch diversion module 11 and the second changeover switch 15, and meanwhile controls the third expansion terminal to output the channel switching instruction to control the second changeover switch 15 to realize the display channel switching, responsive to the instruction outputted from the main chip 13. In other embodiments, the second MCU 14 can also be connected with the channel switching button on the touch panel. A program is written in the second MCU 14, and a channel switching instruction based on the voltage level signal triggered by the channel switching button is outputted. The program can be customized according to the functional requirements of the touch panel.

In an embodiment, as shown in FIG. 2, the first expansion terminal and the first transmission interface B1 is a UART (Universal Asynchronous Receiver/Transmitter) interface, and the second expansion terminal and touch information transmission interface E are USB (Universe Serial Bus) interfaces, and the second input terminal C2 and the second transmission interface B2 are USB interfaces.

Figure 3:
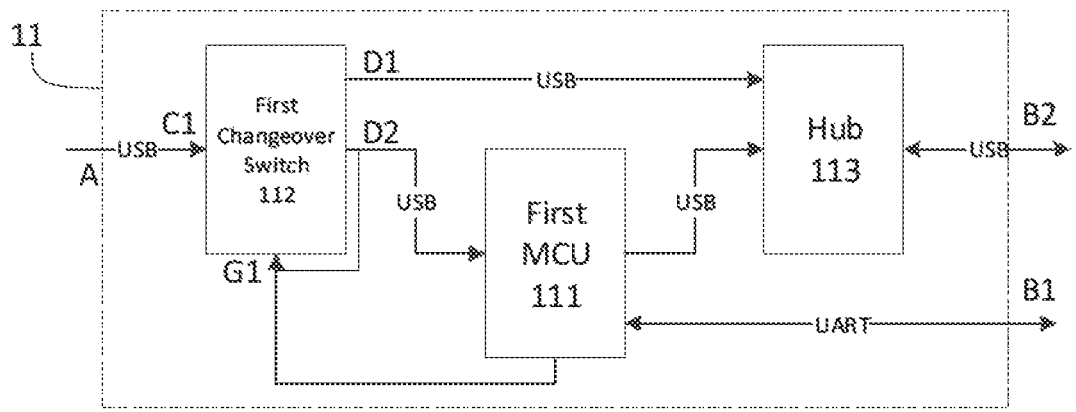
FIG. 3 is a schematic view of the touch diversion module according to an embodiment of the present disclosure.

This embodiment also provides a specific example of the touch diversion module 11, which enables the touch diversion module 11 to fulfill the above functional requirements without affecting the upgrading and debugging of the touch input device. Referring to FIG. 3, FIG. 3 is a schematic view of the touch diversion module 11 according to an embodiment of the present disclosure, which includes a first MCU 11, a first switch 112 and a hub 113. The first switch 112 includes a first control terminal G1, a first input terminal C1, a first output terminal D1 and a second output terminal 122. The hub 113 includes a first access terminal, a second access terminal, and an exit terminal. The first MCU 111 includes an input device connecting terminal, a changeover switch connecting terminal, a main chip connecting terminal and a signal source connecting terminal. The touch diversion module 11 is also configured to receive, via the first transmission interface B1, a branch switching instruction from the touch information transmission interface E of the main chip 13. The main chip connecting terminal of the first MCU 111 is connected with the first transmission interface B1 (realizing the connection of the main chip 13). The first MCU 111 is further configured to output a setting signal from the connecting terminal of the changeover switch responsive to the branch switching instruction, and the connecting terminal of the changeover switch is connected with the first control terminal G1 of the first changeover switch 112. The first changeover switch 112 is configured to determine, responsive to the setting signal received by the first control terminal, that the first input terminal C1 is connected with which one of the first output terminal D1 and the second output terminal D2. The first input terminal C1 is connected with input interface A of the touch diversion module 11. The first output terminal D1 is connected with the first access end of the hub 113. The second output terminal D2 is connected with the input device connecting terminal of the first MCU 111 (realizing the connection of the first MCU 111 with the touch input device), and the signal source connecting terminal of the first MCU 111 is connected with the second access end of the hub 113. The exit terminal of the hub 113 is connected with the second transmission interface 132 of the touch diversion module 11.

With the above connection structure configuration, after the first touch coordinate signal enters the touch diversion module 11 through the input interface A, one of the two branches can be selected for processing. One branch is from the second output terminal D2 of the first changeover switch 112 to the input device connecting terminal of the first MCU 111. In this branch, the first touch coordinate signal is processed by the first MCU 111, and then the second touch coordinate signal is outputted through the main chip connecting terminal (connecting the first transmission interface B1) and/or the signal source connecting terminal (connecting the second transmission interface 132 through the hub 113) of the first MCU 111. In an embodiment, the processing of the first touch coordinate signal by the first MCU 111 can refer to the above embodiment, and this branch of signal processing can meet the functional requirements of the touch diversion module 11 in any embodiment of the disclosure. The other branch is from first output terminal D1 of the first changeover switch 112, through the hub 113, and the signal is outputted via the second transmission interface 82. That is, without any processing, it is equivalent to that there is no touch diversion module 11. Therefore, the debugging or upgrading of the general touch input device can be completed, and when the diversified processing of the touch coordinate signal input by the touch input device is expanded, the device debugging or upgrading function of general touch input is also guaranteed.

Other technical features of the touch panel control circuit of this embodiment can refer to the corresponding configurations in the above embodiments, and will not be repeated here.

In conclusion, according to an embodiment of the present embodiment, a touch diversion module, which receives the first touch coordinate signal from the touch input device and the signal distribution instruction from the main chip, is added to the touch panel control circuit. The function of distributing touch coordinate signal to the external signal source and/or the main chip is further realized, based on the signal distribution instruction. That is, the touch diversion module not only realizes the expansion of the interface to complete the function of distributing touch coordinate signal to two channels, but also customizes an interface protocol on the touch diversion module to realize the distribution of touch coordinate signal based on the signal distribution instruction. Hence, the present disclosure addresses the problem of necessity for adding an output interface to the touch input device, customizing the interface protocol and increasing the development process of touch panel, so as to achieve the effect of enabling use of general touch input device, simplifying the development process of touch panel, and reducing the cost.

EXAMPLE 3

Figure 4:
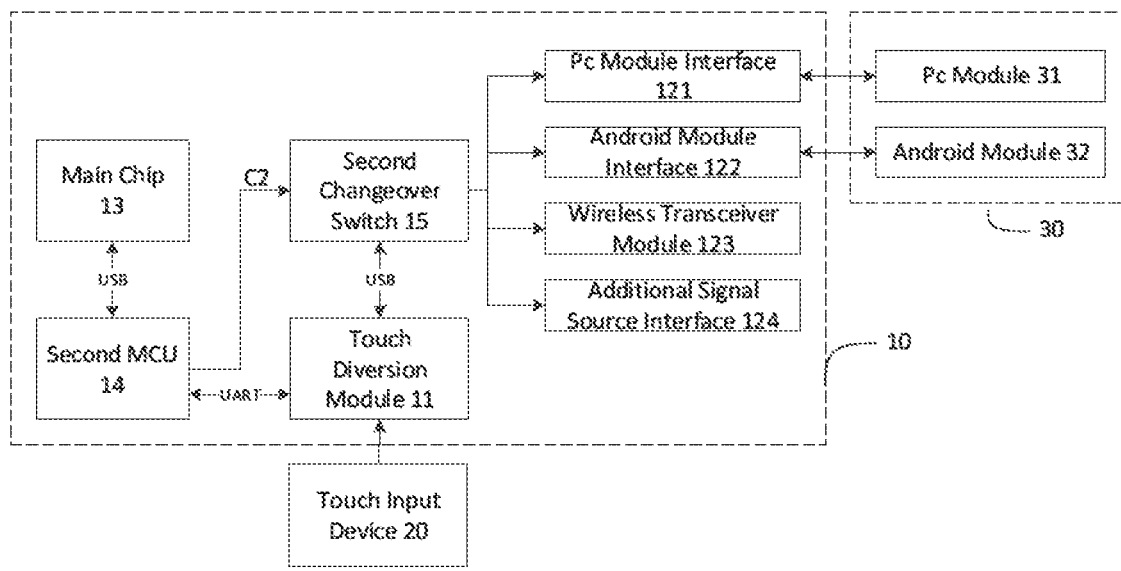
FIG. 4 is a schematic view of the touch panel according to an embodiment of the present disclosure.

FIG. 4 is a structural diagram of the touch panel in an embodiment. The touch panel includes a touch input device 20, and a touch panel control circuit 10 provided by any embodiment of the disclosure. The touch input device 20 includes an output interface which is connected with the input interface of the touch diversion module 11 in the touch panel control circuit 10.

In an embodiment, the touch panel also it a signal source 30, and the signal source interface of the touch diversion module 11 includes a PC module interface 121 and an Android module interface 122. The signal source 30 includes a PC module 31 pluggably connected to the PC module interface 121 and an Android module 32 pluggably connected to the Android module interface 122.

In an embodiment, the touch input device 20 is a capacitive screen touch box, an infrared touch box or an electromagnetic screen.

The touch panel provided by this embodiment includes the touch panel control circuit provided by example 1 or example 2, so it has corresponding beneficial effects.

The terms "first" and "second" are used only for the purpose of description and cannot be understood as indicating or implying relative importance or implicitly indicating the number of technical features indicated. Thus, the features defined as "first" and "second" may explicitly or implicitly include at least one of the features.

What is claimed is:

1. A touch panel control circuit, comprising:
a touch diversion module having an input interface, a first transmission interface and a second transmission interface;
a main chip having a touch information transmission interface connected with the first transmission interface, the touch information transmission interface being configured to connect with an output interface of a touch input device and receive a first touch coordinate signal transmitted from the output interface of the touch input device; and a signal source interface connected with the second transmission interface;

wherein the touch diversion module is configured to receive, via the first transmission interface, a signal distribution instruction from the touch information transmission interface of the main chip, and further responsive to the signal distribution instruction, send a second touch coordinate signal corresponding to the first touch coordinate signal through at least one of the first transmission interface and the second transmission interface.

2. The touch panel control circuit of claim 1, wherein the touch diversion module further comprises a first MCU configured to determine, responsive to the signal distribution instruction, whether the second coordinate signal is to be outputted.

3. The touch panel control circuit of claim 2, wherein if determining an output of the second touch coordinate, the first MCU is further to determine, responsive to the signal distribution instruction, which one of the first transmission interface and the second transmission interface is to send the second touch coordinate signal.

4. The touch panel control circuit of claim 2, wherein responsive to the signal distribution instruction, the first MCU is further to convert, according to a preset coordinate conversion algorithm, the first touch coordinate signal into the second touch coordinate signal.

5. The touch panel control circuit of claim 2, wherein the touch diversion module further comprises:
a first changeover switch having a first control terminal, a first input terminal, a first output terminal and a second output terminal; and
a hub having a first access terminal, a second access terminal and an exit terminal;
wherein the first MCU includes an input device connecting terminal, a changeover switch connecting terminal, a main chip connecting terminal and a signal source connecting terminal;
wherein the touch diversion module is further configured to receive, via the first transmission interface, a branch switching instruction from the touch information transmission interface of the main chip; wherein the main chip connecting terminal of the first MCU is connected with the first transmission interface; the first MCU is further configured to output, responsive to the branch switching instruction, a setting signal through the connecting terminal of the changeover switch, and the connecting terminal of the changeover switch is connected with the first control terminal of the first changeover switch; and
wherein the first changeover switch is configured to determine, responsive to the setting signal received by the first control terminal, that the first input terminal is connected with which one of the first output terminal and the second output terminal; the first input terminal is connected with the input interface of the touch diversion module; the first output terminal is connected with the first access terminal of the hub; and the second output terminal is connected with the input device connecting terminal of the first MCU, wherein the signal source connecting terminal of the first MCU is connected with the second access terminal of the hub, and the exit terminal of the hub is connected with the second transmission interface of the touch diversion module.

6. The touch panel control circuit of claim 1,
wherein the touch panel control circuit further comprises a plurality of signal source interfaces, and a second changeover switch having a second input terminal and a plurality of third output terminals;
wherein the second changeover switch is connected between the second transmission interface of the touch diversion module and the plurality of signal source interfaces, wherein the second input terminal is connected with the second transmission interface, and the plurality of third output terminals are connected with the plurality of signal source interfaces in a one to one correspondence.

7. The touch panel control circuit of claim 6, wherein the touch panel control circuit further comprises a second MCU having a first expansion terminal connected with the first transmission interface, a second expansion terminal connected with the touch information transmission interface, and a third expansion terminal;
wherein the second MCU is connected between the first transmission interface of the touch diversion module and the touch information transmission interface of the main chip; and
wherein the second changeover switch further comprises a second control terminal connected with the third expansion terminal, wherein the third expansion terminal is configured to output a channel switching instruction, and the second changeover switch is configured to determine, responsive to the channel switching instruction received by the second control terminal, which one of the third output terminals is connected with the second input terminal.

8. The touch panel control circuit of claim 7, wherein the first expansion terminal and the first transmission interface are UART interfaces, and the second expansion terminal and the touch information transmission interface are USB interfaces, and the second input terminal and the second transmission interface are USB interfaces.

9. A touch panel, comprising:
a touch panel control circuit of claim 1, and a touch input device having an output interface connected with the input interface of the touch diversion module in the touch panel control circuit.

10. The touch panel of claim 9, wherein the touch input device is selected from a capacitive screen touch box, an infrared touch box or an electromagnetic screen.

* * * * *